US008533464B2

(12) United States Patent
Sorniotti et al.

(10) Patent No.: US 8,533,464 B2
(45) Date of Patent: Sep. 10, 2013

(54) REVOCATION OF CREDENTIALS IN SECRET HANDSHAKE PROTOCOLS

(75) Inventors: Alessandro Sorniotti, Antibes (FR); Micele Bezzi, Le Haut Sartoux-Valbonne (FR); Gilles Montagnon, Mougins (FR); Stuart Short, Mougins (FR); Slim Trabelsi, Mougins (FR)

(73) Assignee: SAP AG, Walldorf (DE)

( * ) Notice: Subject to any disclaimer, the term of this patent is extended or adjusted under 35 U.S.C. 154(b) by 345 days.

(21) Appl. No.: 12/637,411

(22) Filed: Dec. 14, 2009

(65) Prior Publication Data

US 2011/0087880 A1    Apr. 14, 2011

Related U.S. Application Data

(60) Provisional application No. 61/139,265, filed on Dec. 19, 2008.

(51) Int. Cl.
*H04L 29/06* (2006.01)

(52) U.S. Cl.
USPC ......................................................... 713/158

(58) Field of Classification Search
USPC .............. 713/156, 158, 168; 726/5; 709/237
See application file for complete search history.

(56) References Cited

U.S. PATENT DOCUMENTS

| 7,289,632 | B2 * | 10/2007 | Buer .............................. 380/278 |
| 8,037,522 | B2 * | 10/2011 | Holtmanns et al. .............. 726/19 |
| 2004/0247131 | A1 * | 12/2004 | Buer .............................. 380/278 |
| 2007/0240205 | A1 * | 10/2007 | Holtmanns et al. ................ 726/5 |
| 2008/0037793 | A1 * | 2/2008 | Buer .............................. 380/282 |

FOREIGN PATENT DOCUMENTS

EP     2023528 A1    2/2009

OTHER PUBLICATIONS

Gene Tsudik, "A Flexible Framework for Secret Handshakes", pp. 295-315, 2006.*
Drik Balfanz, "Secret Handshakes from Pairing-Based Key Agreements", 2003 IEEE Symposium on Security and Privacy (SP03).*

(Continued)

*Primary Examiner* — Samson Lemma
(74) *Attorney, Agent, or Firm* — Brake Hughes Bellermann LLP (57) ABSTRACT

According to a general aspect, a computer-implemented method for a first user to verify an association with a second user through a secret handshake protocol includes maintaining information about a reusable identification handle for the first user, where the information about the reusable identification handle is provided by a trusted third party, maintaining information about a reusable credential for the first user, where the information about the reusable credential is provided by a trusted third party, and maintaining information about a matching reference for verifying an association with another user, where the information about the matching reference is provided by a trusted third party. Information based on the reusable identification handle and based on the reusable credential is transmitted to a potential peer. First information based on a reusable identification handle for the second user is received, and second information based on a reusable credential for the second user is received. A first comparison of a combination of the first information and the second information is performed with the matching reference to determine whether the second user's credentials match the first users matching reference. A second comparison of the first information with information published on a revocation list is performed to determine whether the second user's credentials have been revoked from usage. Based on the first comparison and the second comparison, a determination is made whether or not to verify the association of second user with the first user.

20 Claims, 3 Drawing Sheets

(56) References Cited

OTHER PUBLICATIONS

Extended European Search Report for EP Patent Application No. 08291221.3, mailed Jul. 21, 2009, 10 pages.

Response to Extended European Search Report for EP Patent Application No. 08291221.3, filed Sep. 3, 2009, 6 pages.

Balfanz, D., et al, "Secret Handshakes From Pairing-Based Key Agreements", Proceedings of the 2003 IEEE Symposium on Security and Privacy (May 11-14, 2003), pp. 180-196.

Wojno, C. R., et al, "Secret Handshakes: Keeping Secret Groups Secret", Term Paper (Apr. 26, 2008), 6 pages.

Castelluccia, C., et al, "Secret Handshakes From CA-Oblivious Encryption", in ASIACRYPT (Aug. 31, 2004), pp. 293-307.

Sorniotti, A., et al, "A Provably Secure Secret Handshake With Dynamic Controlled Matching", Proceedings of IFIP (May 18, 2009), 12 pages.

* cited by examiner

REVOCATION OF CREDENTIALS IN SECRET HANDSHAKE PROTOCOLS

CROSS-REFERENCE TO RELATED APPLICATION

This application claims priority under 35 U.S.C. §119 to Provisional Patent Application 61/139,265, filed Dec. 19, 2008, titled "REVOCATION OF CREDENTIALS IN SECRET HANDSHAKE PROTOCOLS," which is incorporated herein by reference in its entirety.

TECHNICAL FIELD

This description relates to secret handshakes and, in particular, to revocation of credentials in secret handshake protocols.

BACKGROUND

Secret Handshakes permit trust to be established between two parties in non-trustworthy environments. For example, two field agents of the Central Intelligence Agency ("CIA") may need to contact each other in the field, while retaining their anonymity, so that they are not discovered by a counter-intelligence agent. A secret handshake allows the CIA agents to mutually authenticate themselves to each other through the exchange of certain credential information according to a special protocol, where the exchange of the credential information through the protocol would not compromise their anonymity if it were exchanged with a non-agent that is unable to participate properly in the secret handshake.

Thus, secret handshakes involve the mutual verification of matching credential information possessed by two users. Generally, it is possible that separate entities or users own credentials that are derived from group membership (e.g., membership in the CIA), from the possession of some property, or from the possibility to generate or detect particular events. All of these characteristics (i.e., group membership, possession of a particular property, and the possibility to generate or detect a particular event) are referred to herein with the term "property." When two entities interact, for example, by moving within the proximity of each other, by using a common resource, and so forth, they can perform a secret handshake to mutually verify credentials owned by the two users match, i.e., whether the two credentials are complementary according to some pre-defined definition of complementariness.

To assure the confidentiality, untraceability and anonymity of the credential information exchanged during a secret handshake the credentials to be matched can be exchanged in an encrypted and randomized form.

In addition, the current theoretical framework of secret handshakes does not provide a satisfactory model for credential revocation from a user. Thus, if credentials fall into the hands of an unauthorized user, the unauthorized user could pass himself off as the legitimate user, at which point, the attacker could conduct business on the behalf of the legitimate user to achieve malicious goals of the unauthorized user.

Revocation of users' credentials requires a way of uniquely labeling each credential, so that legitimate users can reject any handshake attempt containing credentials labeled as revoked. However, tagging credentials to tell them apart implies that the anonymity of users whose credentials are not to be revoked is also compromised. Thus, the ability to reliably revoke credentials could result in a high breach in the anonymity of users, which limits the applicability of secret handshake protocols.

Thus, it is desirable to provide a credential revocation mechanism to revoke compromised credentials and issue fresh credentials to a legitimate user, with no nasty consequence whatsoever.

SUMMARY

According to a general aspect, a computer-implemented method for a first user to verify an association with a second user through a secret handshake protocol includes storing information about a reusable identification handle for the first user, where the information about the reusable identification handle is provided by a trusted third party, storing information about a reusable credential for the first user, where the information about the reusable credential is provided by a trusted third party, and storing information about a matching reference for verifying an association with another user, where the information about the matching reference is provided by a trusted third party. Information based on the reusable identification handle and based on the reusable credential is transmitted to a potential peer. First information based on a reusable identification handle for the second user is received, and second information based on a reusable credential for the second user is received. A first comparison of a combination of the first information and the second information is performed with the matching reference to determine whether the second user's credentials match the first users matching reference. A second comparison of the first information with information published on a revocation list is performed to determine whether the second user's credentials have been revoked from usage. Based on the first comparison and the second comparison, a determination is made whether or not to verify the association of second user with the first user.

In another general aspect, a system includes a memory and a computer-readable storage medium for a first user to verify an association with a second user through a secret handshake protocol. The memory maintains: (a) information about a reusable identification handle for the first user, where the information about the reusable identification handle is provided by a trusted third party; (b) information about a reusable credential for the first user, where the information about the reusable credential is provided by a trusted third party; and (c) information about a matching reference for verifying an association with another user, where the information about the matching reference is provided by a trusted third party. The computer-readable storage medium includes instructions that, when executed, cause: (d) transmitting information based on the reusable identification handle and based on the reusable credential to a potential peer; (e) receiving first information based on a reusable identification handle for the second user; (f) receiving second information based on a reusable credential for the second user; (g) performing a first comparison of the first information and the second information with the matching reference to determine whether the second user's credentials match the first users matching reference; (h) performing a second comparison of the first information with information published on a revocation list to determine whether the second user's credentials have been revoked from usage; and (i) based on the first comparison and the second comparison determining whether or not to verify the association of second user with the first user.

In another general aspect, a system includes a means for storing information about a reusable identification handle for the first user, where the information about the reusable identification handle is provided by a trusted third party, a means for storing information about a reusable credential for the first user, where the information about the reusable credential is provided by a trusted third party, and a means for storing information about a matching reference for verifying an association with another user, where the information about the matching reference is provided by a trusted third party. The system includes a means for transmitting information based on the reusable identification handle and based on the reusable credential to a potential peer, a means for receiving first information based on a reusable identification handle for the second user, and a means for receiving second information based on a reusable credential for the second user. The system includes a means for performing a first comparison of the first information and the second information with the matching reference to determine whether the second user's credentials match the first users matching reference, a means for performing a second comparison of the first information with information published on a revocation list to determine whether the second user's credentials have been revoked from usage, and a means for determining whether or not to verify the association of second user with the first user, where the determination is based on the first comparison and the second comparison.

Implementations can include one or more of the following features. For example the information based on the reusable identification handle and the information on the reusable credential can be cryptographically encoded prior to transmission. Cryptographically encoding the information can include generating a random value, generating a cryptographically-encoded version of the information based on the reusable identification handle based on the information handle and the random value, and generating a cryptographically-encoded version of the information based on the reusable credential based on the information handle and the random value. The information about the reusable identification handle for the first user and the information about a reusable credential for the first user can be receiving via a secure channel from an authentication component upon verification that the first user is entitled to be associated with the second user. The matching reference can be received via a secure channel upon verification that the first user is entitled to verify that the second user is associated with the first user. Information about the reusable credential for the first user can be cryptographically-encoded such that the user is prevented from acquiring direct knowledge of the actual reusable credential for the user, and the information about the reusable identification handle for the first user can cryptographically-encoded such that the user is prevented from acquiring direct knowledge of the actual reusable identification handle for the user.

The information based on a reusable identification handle for the second user can be additionally based on a random number generated at by the second user, and the information based on a reusable credential for the second user can be additionally based on the random number generated at by the second user.

The first information received from the second user based on the reusable identification handle for the second user can be cryptographically-encoded such that the both the first user and the second user are prevented from acquiring direct knowledge of the actual reusable credential for the second user, and performing the second comparison of the first information with information published on a revocation list to determine whether the second user's credentials have been revoked from usage can include performing the comparison to determine whether a match exists between the first information and the information published on the revocation list without revealing the second user's credentials to either the first or the second user.

The details of one or more implementations are set forth in the accompanying drawings and the description below. Other features will be apparent from the description and drawings, and from the claims.

DETAILED DESCRIPTION

When two entities need to cooperate in a hostile environment, they must first establish some initial trust. This initial trust can be then used to create secure channels, to establish integrity protected communications, to provide anonymity, non-revocation or any other high security requirement designed. However, the weak element of this seemingly strong chain is the initial assessment of trust: if during that phase, an individual gives its trust to a malicious entity, all the security measures taken thereafter are vain. A secret handshake can be used to establish such initial trust.

In a potentially hostile environment (e.g. an environment in which competing companies exist, where hackers on the Internet exist, or where criminals and spies) entities are not trusted a priori, so a user may not want to reveal who he is and what his characteristics, properties, interests are during a handshake protocol. However, if no initial information is exchanged, then no subsequent relation can exist. Therefore, this initial exchange of information to establish trust between two entities must be secret, in that it must be intelligible only for a trustworthy party, and protected by means of cryptography against non-trustworthy parties.

A trustworthy party can be identified as a party that possesses some particular property (e.g., employment as a CIA agent, an air marshal, etc.), the possession of which indicates that the user wants to interact with the party and can trust the party. A property is any important feature that a user possesses and wants to use as the basis for verifying an association with another user. Thus, a user may want to verify the properties of another user and may want to reveal its property to the other user, so that the two users can establish a mutual initial trust. Examples of properties are name, domain, group membership, business sensitive information. A user generally wants to reveal his property only with entities that are entitled to verify the property, giving no clue about the nature of her property to non-authorized entities. The authorization to verify some other user's credentials is based on some pre-defined policy or polices.

Possession of the particular property of interest can be certified by a trusted party ("TTP"), so that the certification of the property can always be traced to someone (e.g., the TTP) who is trusted a priori by the user. The trusted third party can certify that the user possesses the particular property of interest by performing a verification process to verify possession of the property. Upon satisfactory completion of the verification process the trusted third party can provide a property credential that certifies what has been verified (e.g., that the user possess the particular property). Thus, a property credential is the certification of a property owned by a user and is issued by a certification entity (e.g., a trusted third party). Holding a property credential allows a user to convince another user that the former possesses the certified property. Properties can be certified cryptographically, so that the cryptographically encoded property credential information must be decoded later by another user to verify that the user has possession of the particular property. An authentication center that acts as a trusted third party (e.g., a trusted person, organization, computer server, computation device, etc.) can act to certify membership, qualifications, properties of users and so forth, which are matter of certification, and the authentication center can grant to users property credentials that will be later used to prove possession of a particular property via the exchange of information in a secret handshake protocol. The authentication center also can grant the right to perform a verification of another user's property credentials by issuing to each user that will be able to use the secret handshake a matching reference that allows the user to verify if the secret handshake is performed with an another entity that possesses a valid property credential. Thus, a matching reference owned by a second user has a relationship with a property credential owned by a first user, and the matching reference allows the second user to verify whether the first user has a particular property.

For example, during a secret handshake a first user acting as a "prover" can act to demonstrate possession of a property to a second user, and the second user acting as a "verifier" can act to verify that the first user possesses the property. Of course, during a secret handshake each user must act as both a prover and a verifier, so that the two users can verify an association with each other by each verifying that the other possesses a particular property. Thus, in general, a user is the entity fully executing the secret handshake protocol, acting both as prover and verifier in turn.

As discussed herein, secret handshakes are mechanisms designed to prove possession of a property to another party, and to verify the other party's possession of a property. When using a secret handshake protocol, non-authorized parties must not be able to either fake the possession of a property or to recognize the possession of a property if they are not entitled to do so according to the aforementioned policies of the system. In addition, secret handshake communications are designed to provide untraceability of information exchanges during a secret handshake protocol, so that eavesdropping on the information exchange cannot be used to trace the source of the information to a particular user.

Providing the possibility of revoking credentials provides a measure of protection against a successful attacker who manages to steal the credentials of a legitimate user, such that he can pass himself off as the legitimate user, conducting business on his behalf with disastrous consequences. The challenge in revoking credentials, however, is to be able to do so in such a highly secure system, where it is necessary that credentials be untraceable to protect anonymity but also that particular credentials of a compromised user can be identified if they need to be revoked. That is, to preserve the anonymity of users that participate in secret handshake protocols means that regardless of the outcome of any two given handshake, h1 and h2, no user must be able to link either handshakes h1 or h2 as having been generated from the same user. On the other hand, revocation of a credential that was previously valid requires the ability to single out (and discard) each handshake performed by a user that uses the revoked credentials. Techniques for accomplishing these competing goals are described herein.

Figure 1:
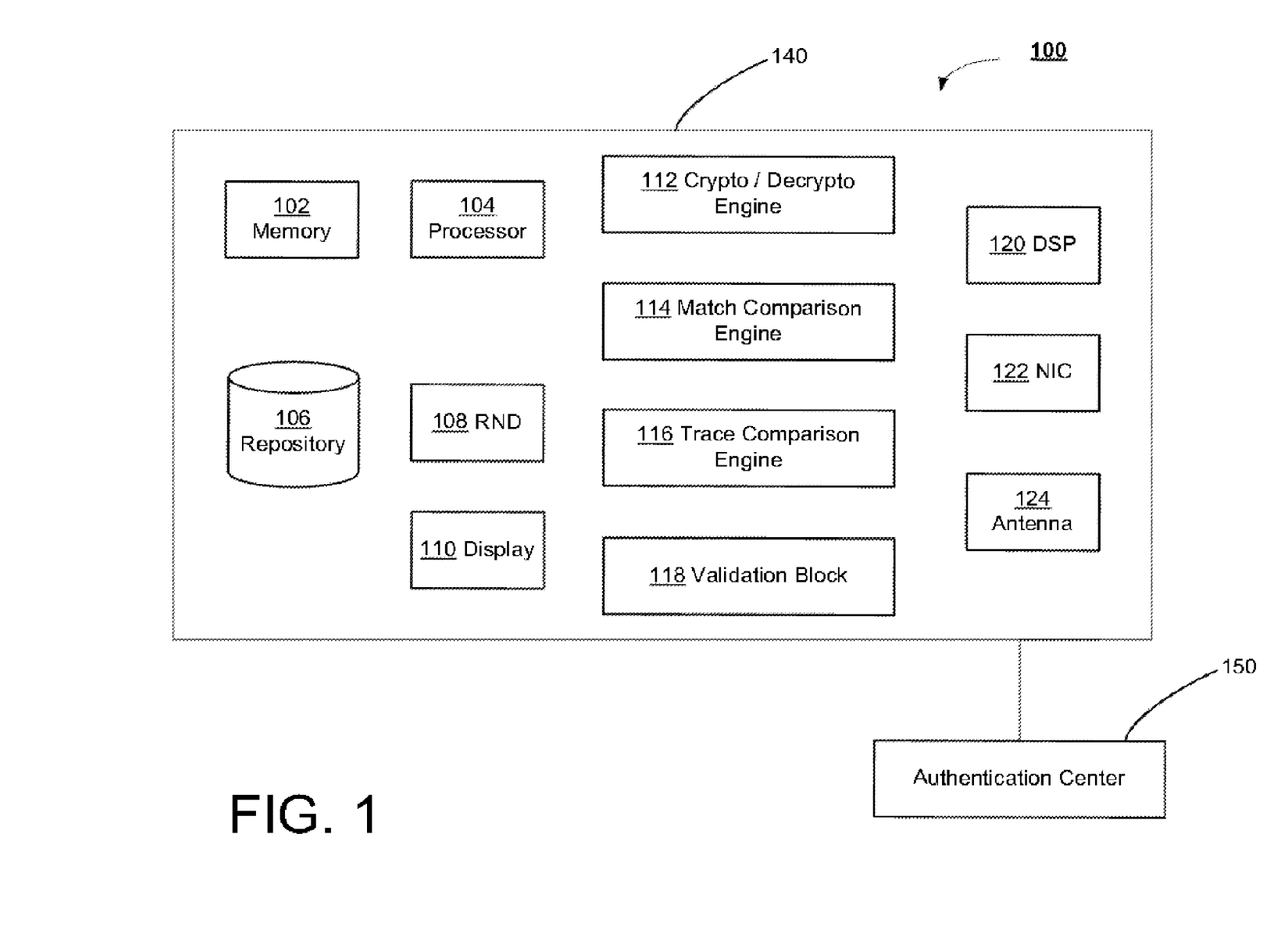
FIG. 1 is a schematic block diagram of a system 100 or performing a secret handshake.

FIG. 1 is a schematic block diagram of a system 100 for performing a secret handshake. The system can include a user device 140 that communicates with an authentication server 150 to receive initial information prior to executing the secret handshake protocol. For example, a user can first contact an authentication center, to which the user must prove possession of the property that the property credentials used in the secret handshake will represent. After successfully proving possession of the property (e.g., that the user really is a CIA agent, really is an air marshal, etc.), the user receives, from the authentication server 150, the required property credential(s) necessary for use in the secret handshake protocol when the user is acting as a prover. The property credential(s) can be stored in repository 108 (e.g., a memory device, such as a hard disk drive, a flash memory, an EPROM, a ROM). In addition, the user also can receive a matching reference from the authentication center 150, which can be stored in the repository 106 for use in carrying out the matching process of the secret handshake protocol, when acting as a verifier in the protocol (i.e., to verify possession of (possibly another) property by a different user that is acting as a prover).

During execution of the secret handshake protocol, two users exchange the property credentials they received from the authentication center 150. The property credential can be appropriately encrypted with random numbers so as to make the exchange of the credential information untraceable. For example, a random number generator 108 can include circuitry for generating a pseudo-random number, and an encryption engine 112 can be configured to encode the credential information using the random number from the random number generator. Using the exchanged information combined with the matching references the users received from the authentication center, each user participating in the secret handshake can verify whether the other user possesses the property object of the matching reference owned by the user. For example, the match comparison engine 114 can receive the credential information from another user that is acting as a prover and the matching reference information stored in the repository 106 of the users' device, and, using the credential information and the matching reference information, can determine whether a match exists. Both the comparison engine 114 and the encryption engine 112 can be executed by a processor 102 (e.g., a CPU, an ASIC, a FGPA, a DSP, etc.), that executes code instructions stored in a memory 104 (e.g., a RAM, a ROM, an EPROM, an EEPROM, a flash memory, or a disk).

To allow revocation of property credentials without modifying the nature of secret handshakes, the complete credential information for a user can include two parts—an identification handle for the user and a property credential for the user, each of which may be received from the authentication center 150 and stored in the repository 106. The identification handle is unique to the user, while the combination of the identification handle and the property credential will be used to match the matching reference of a verifier. Thus, conceptually, one can imagine that each user receives an identification handle (e.g., value "A") and a property credential (e.g., value "B"), where the values of A and B are unique to each user, but where a function f exists such that f(A, B) is the same for all users and used to match another user's matching reference in a secret handshake.

The combination of both the identification handle and the property credential for the user then are necessary for a user acting as a prover to successfully execute a secret handshake protocol. Thus, users are not given all of the necessary information to act as a prover by the authentication center 150 directly. Rather, users are provided with two separate pieces of information, both of which are necessary to act as the prover. The authentication center 150 can provide both the identification handle and the property credential to the user in terms of powers of a generator in terms of a group of prime order, so as to prevent their direct knowledge of the identification handle or the property credential by the user.

Then, if a user (a "first user") wants to act as a prover to authenticate himself to another user (a "second user"), the first user must send both its identification handle and its property credential. Both the identification handle and the property credential for a user can be salted with random numbers before being transmitted to the other user, so that during transmission they appear to be random numbers and therefore preserve the untraceability of the protocol exchange.

When the credentials of a user need to be revoked (e.g., because the user's device 140 and/or the user's credentials have been lost, stolen, or otherwise compromised) the authentication center 150 can publish on a revocation list that is accessible to users of the secret handshake protocol the identification handle of the user whose credentials are to be revoked. Other users can check this public list and load the value of the revoked identification handle in the repository 106. Then, during a matching process of the secret handshake protocol, a trace comparison engine 116 can check whether the identification handle of the user acting as the prover in the protocol matches an identification handle that has been published on the revocation list. If a match is found with a revoked identification handle, then this fact can be reported to a validation block 118, which then can reject the handshake and inform the user that the attempted handshake has been rejected (e.g., via information displayed on the display 110).

In the following, a concrete scheme is presented for performing a secret matching. To implement the scheme, we assume three groups, $(G_1, +)$, $(G_2, +)$, and $(G_T, \times)$ of order q for some large prime number, q, where the bit size of q is determined by a security parameter, k. The scheme uses any computable, non-degenerate bilinear map, $\hat{e}: G_1 \times G_2 \to G_T$, for which the symmetric eXternal Diffie-Hellmann (SXDH) problem is assumed to be hard. Modified Weil or Tate pairings on certain subgroups of MNT elliptic curves are examples of such maps.

We let g be a random generator of the group $G_1$, and we let h be a random generator of the group $G_2$. We let s, $w \in Z_q^*$ be chosen at random, where $Z_q^* = \{1, \ldots, q-1\}$, and we set $W = g^w$ mod q. In this scheme the system public parameters are $\{q, G_1, G_2, G_T, \hat{e}, g, h, W\}$, and the system secret parameters are the values s and w.

When users contact the authentication center to acquire their credential information (i.e., their property credentials and their identification handle), the authentication center must check to certify that each user actually possesses the particular property that is being certified and that the user will later claim to possess during the secret handshake protocol execution. After a successful check, the authentication center issues to the users u the identification handles, $ID_u = g^{x_u}$ mod q, and the property credentials represented by the 3-tuple $cred_{p,u} = \langle g^{zw(x_u+c_p)} \mod q, h^{(zw)^{-1}}, h^{z^{-1}} \rangle$. The parameter $x_u$ holds a secret value associated with the user u, whose purpose is to contain the identification handle within the credential. The parameter $c_p$ holds a value associated with the property p that is being certified. The valued z is a drawn at random by the authentication center at each new query. The elements of the 3-tuple forming the property credential may be referred to as $cred_{u,p,1}$, $cred_{u,p,2}$ and $cred_{u,p,3}$.

The authentication center 150 also verifies that, according to the policies of the system, the user u is entitled to verify that another user possesses the particular property p. If the checking is successful, the certification entity issues the appropriate matching reference $match_p = h^{c_p}$ to the user. Note that match does not include a subscript u and therefore is not a user-specific value. Rather, owning the matching reference $match_p$ entitles the user to act as a verifier in a secret handshake protocol with any user $u \in U$ that is acting as a prover to prove possession of the property p, where U is the set of all users that can participate in the secret handshake protocol. Of course, different parameters p can be matched, which may require different matching references for the different parameters, hence the subscript p.

When two users execute a secret handshake protocol in a peer-to-peer environment, each user may act both as a prover and as a verifier. When the user is acting as a prover, the user's credential information, $ID_u$ and $cred_{p,u}$ are encrypted and anonymized prior to transmission to the other user acting as the verifier. For example, the prover may generate or draw two random values $r_1$, $r_2$, with which to generate an encrypted or disguised version of his credential information, $\langle cred_{u,p,1}^{r_1 r_2}, cred_{u,p,2}^{r_2^{-1}}, cred_{u,p,3}^{r_1}, ID_u^{r_1}, g^{r_1} \rangle$, that includes disguised versions the $ID_u$ and the $cred_{p,u}$ values for the user and the generator g raised to the power $r_1$. This information then is sent to the user that acts as the verifier, and the verifier can use the information to authenticate an association with the prover by matching information in the $ID_u$ and $cred_{p,u}$ information with the matching reference owned by the verifier. The sending can be carried out though a digital signal processor ("DSP") 120, a network interface card ("NIC") 122 and broadcasted by an antenna 124 if the message is transmitted wirelessly. Random numbers can be generated by the random number generator 108.

When a user is acting as verifier during the protocol execution, the match comparison engine 114 for the user u takes as inputs the disguised credentials $\langle cred_{u',p,1}^{r_1 r_2}, cred_{u',p,2}^{r_2^{-1}}, cred_{u',p,3}^{r_1}, ID_{u'}^{r_1}, g^{r_1} \rangle$, received from a user u' that acts as the prover during the protocol execution and the matching reference $match_{p'}$ issued by the certification entity to u in order to be able to match property $p' \in P$ that the user u' claims to possess. The match comparison engine 114 returns true if the equivalences $$\begin{cases} \hat{e}\left(cred_{u',p,1}^{r_1 r_2}, cred_{u',p,2}^{r_2^{-1}}\right) = \hat{e}(ID_{u'}^{r_1}, h) \cdot \hat{e}(g^{r_1}, match_{p'}) \\ \hat{e}\left(W, cred_{u',p,2}^{r_2^{-1}}\right) = \hat{e}\left(g, cred_{u',p,3}^{r_2^{-1}}\right) \end{cases}$$

are both satisfied. The equivalence means that user u' possesses the property p', or, equivalently, that p=p'. Otherwise, the engine 114 returns false.

In addition to checking whether a match exists between the matching reference of u and the information combined in the identification handle and the credential of u', the user also must ensure that the u' is not using revoked credentials. To do this, the trace comparison engine 116 for the user u takes as inputs the disguised credentials $\langle cred_{u',p,1}^{r_1 r_2}, cred_{u',p,2}^{r_2^{-1}}, cred_{u',p,3}^{r_1}, ID_{u'}^{r_1}, g^{r_1} \rangle$ received from a user u' acting as the prover during the protocol execution and revocation values $revoc_{u''} = h^{x_{u''}}$ for a user u''. The trace comparison engine 116 returns true if the equivalence, $$\hat{e}(ID_{u'}^{r_1}, h) = \hat{e}(g^{r_1}, revoc_{u''})$$

is satisfied. The equivalence means that even if the outcome of the matching process performed by the match comparison engine 114 were true, that the user u should reject the handshake because the credentials of the user u' have been revoked. The outputs of both the match comparison engine 114 and the trace comparison engine 116 can be fed to the validation block 118. The validation block informs the user (e.g., via the display 110 or via an audio signal or via an electrical signal or otherwise) that the handshake has been or should be accepted if the outcome of the match comparison engine 114 is true AND the outcome of the trace comparison engine 116 is false. Otherwise, for any other combination of outputs from the match comparison engine 114 and the trace comparison engine 116 the user can be informed that the handshake has not been or should not be accepted.

Figure 2:
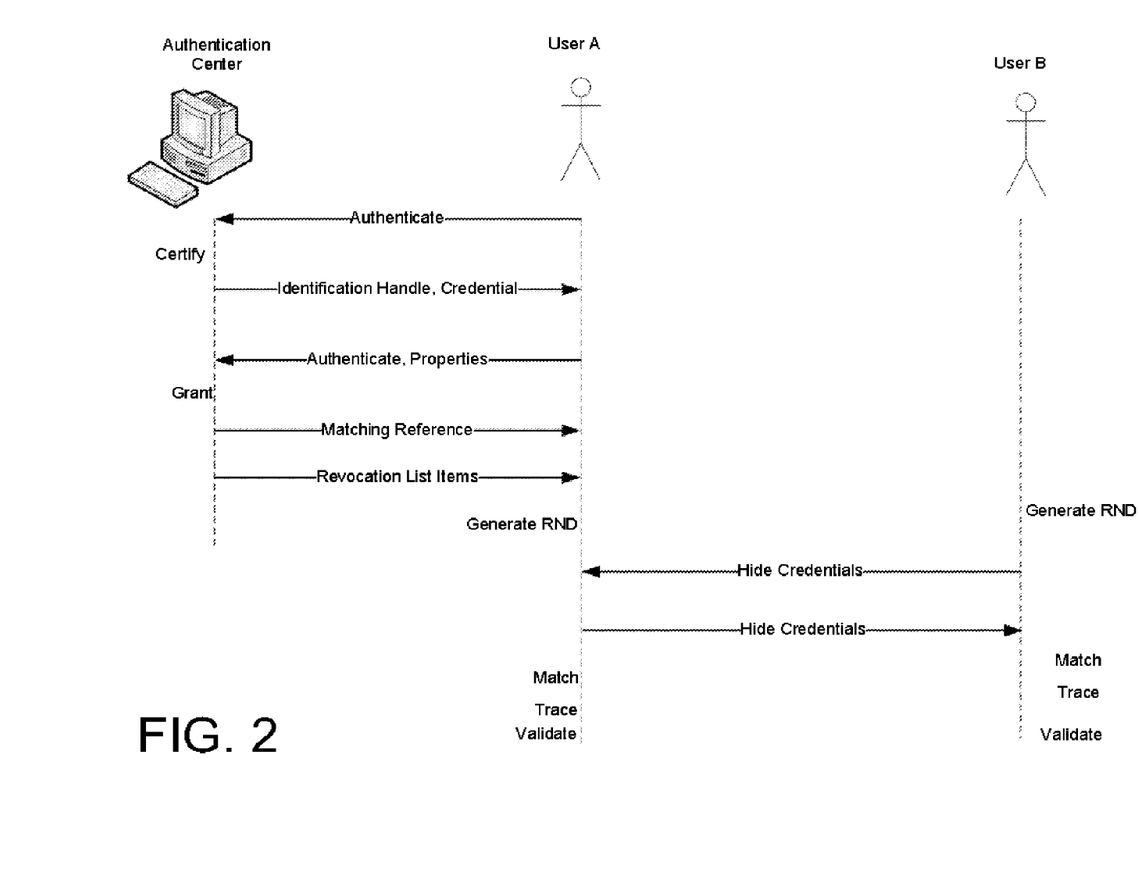
FIG. 2 is a sequence diagram of a secret handshake protocol.

FIG. 2 is a sequence diagram of a secret handshake protocol. A first user (User A) 202 can act as a verifier, and a second user (User B) 204 can act as a prover. Proceeding from the top of the page to the bottom User A 202 provides information to the authentication center 206 to provide specific assurances about relevant aspects of User A, such as, for example, User A's identity, membership, characteristics, roles or, generally about User A's properties. After a successful authentication User A receives credential information that includes an identification handle for User A and one or more credentials, where each credential is associated with at least one of User A's relevant properties. Next, User A also contacts the authentication center and, after a successful authentication, receives one or more matching references that User A can use to carry out a matching process with a different user. User A also can receive information about users whose credentials have been revoked, and this information can be provided by the authentication center or by some other source that supplies information about revoked users such as public revocation lists. User A may contact the source of this revocation information multiple times to maintain an updated list of revoked user. User B 204 also engages with the authentication center to receive a unique identification handle, credentials, matching references, and revocation information, so that it can participate in the mutual authentication during a secret handshake.

During a secret handshake between User A and User B, User A generates random numbers and uses the random numbers to send disguised versions of its identification handle and property credential(s) to User B. User B also generates random numbers and uses the random numbers to send disguised versions of its identification handle and property credential to User A. After User A receives User B's information, User A can perform a matching process to check if a matching between his matching reference and the information contained in the combination of User B's disguised identification handle and property credential is satisfied. User A also checks in a trace process whether User B's identification handle corresponds to information on a revocation list, indicating that the user's credentials have been revoked. Finally, User A can validate an association between User A and User B if the matching is positive and if the trace is negative.

Likewise, after User B receives User A's information, User B can perform a matching process to check if a matching between his matching reference and the information contained in the combination of User A's disguised identification handle and property credential is satisfied. User B also checks in a trace process whether User A's identification handle corresponds to information on a revocation list, indicating that the user's credentials have been revoked. Finally, User B can validate an association between User A and User B if the matching is positive and if the trace is negative.

Figure 3:
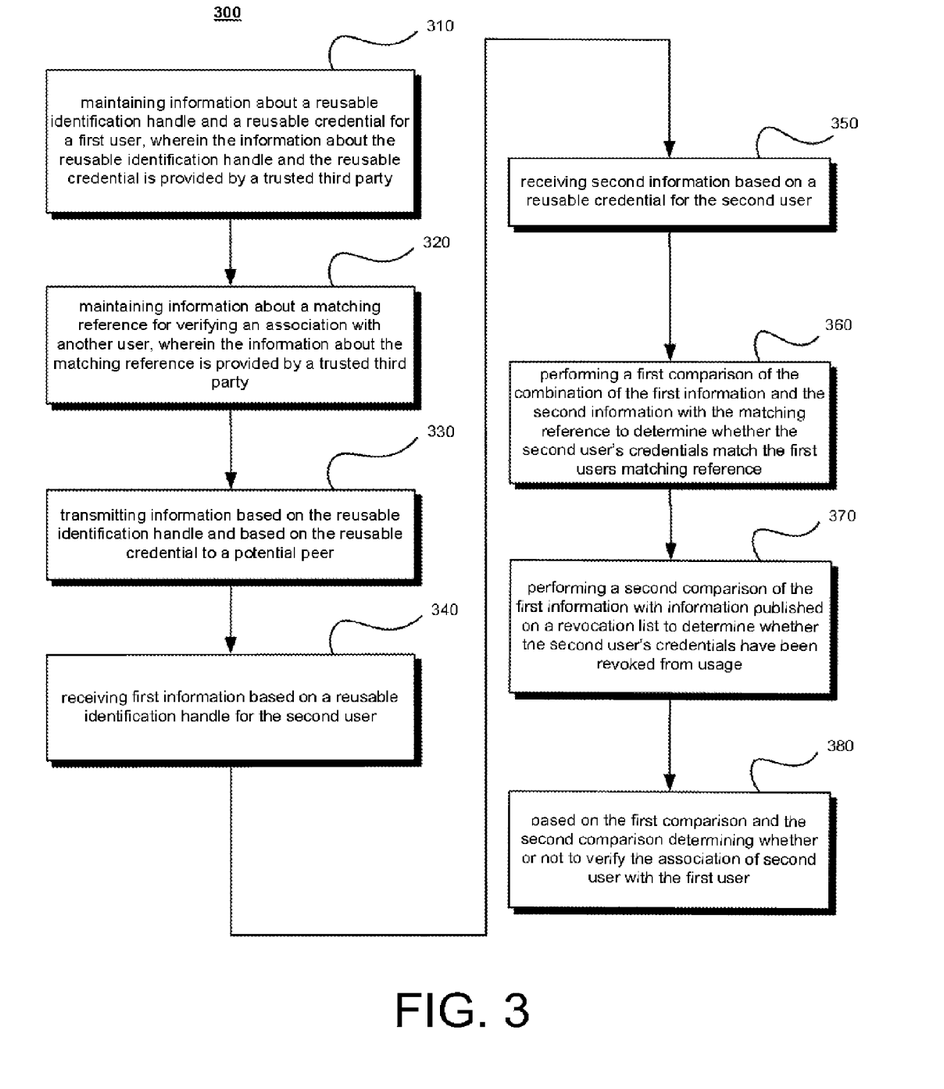
FIG. 3 is a flow chart of a secret handshake process.

FIG. 3 is a flow chart of a secret handshake process 300. Process 300 may include storing information about a reusable identification handle and a reusable credential for a first user, where the information is provided by a trusted third party (310). For example, the repository 106 can maintain this information after it has been received from an authentication server that acts as a trusted third party. Information about a matching reference for verifying an association with another user can be maintained, where the information about the matching reference also is provided by a trusted third party (320). Again, for example, the repository 106 can maintain this information after it has been received from an authentication server that acts as a trusted third party.

Information based on the reusable identification handle and based on the reusable credential to a potential peer can be transmitted to a peer (330). In one implementation, the information based on the reusable identification handle and based on the reusable credential can include data that encrypts or disguises the information about the identification handle and the reusable credential. For example, the encryption/decryption engine 112 can perform this encryption using random numbers generated locally and generated by the peer. Random numbers may be generated by the random number generator 108. Because the encryption can be performed each time the information is transmitted using different random numbers each time, the identification handle and the credential can be reused, rather than having to maintain many different pseudonyms for the user. The information can be transmitted, for example, by preparing the information in the DSP 120, routing it through the NIC 122, and sending it wirelessly over a wireless link via the antenna 124. In another implementation, the information can be sent via a wired link.

First information based on a reusable identification handle for a second user can be received (340), and second information based on a reusable credential for the second user can be received (350). For example, the information about the reusable identification handle and the reusable credential for the second user can be received in a disguised or encrypted form. The information can be received through a path that could include the antenna 124, the NIC 122, and the DSP 120. A first comparison of the first information and the second information with the matching reference can be performed to determine whether the second user's credentials match the first users matching reference (360). For example, the match comparison engine 114 can perform this comparison. A second comparison of the first information with information published on a revocation list can be performed to determine whether the second user's credentials have been revoked from usage (370). For example, the trace comparison engine 116 can perform this comparison based on information from a revocation list that is maintained by the authentication center 150 or another entity, or based on information above revoked users and user credentials, which has been provided to the user over time and which is then maintained by the user. Finally, based on the first comparison and the second comparison a determination may be made whether or not to verify the association of second user with the first user (380). For example, the validation block 118 can perform this determination.

Using the techniques described herein, privacy with respect to third parties that are not involved in the secret handshake between the first and the second user can be guaranteed. A third party who monitors the information exchanges between the first and the second users as legitimate peers cannot retrieve any information about the credentials and the identity of the communicating parties during the information exchange, even over several exchanges, because the exchanged information about the reusable identification handle and the reusable credential is disguised and encrypted using different random numbers each time the information is transmitted. Therefore, anonymity and unlinkability are guaranteed. Furthermore, privacy is also guaranteed with respect to so-called protocol players. Each party, namely the first user and the second user, respectively, is only authorized to check whether another party, namely the first and the second user, respectively, holds credentials that match its own credentials based on pre-given matching policies. Those matching rules can include equivalence of the credentials to be compared or complementarity of the respective credentials. Moreover, authorization is also guaranteed. In order to be able to perform a secret verification, each party, namely the first and the second user, respectively, must be authorized by granting of an appropriate credential and identification handle and an appropriate matching reference by the already mentioned trusted third parties, namely the described authentication center. Furthermore, security of credential representation can also be guaranteed. Only parties, namely the first and the second user, holding valid credentials can run a successful mutual verification. There is no danger of forgery, reverse computation, etc.

The techniques described herein have many practical uses. In general, a distinction can be drawn between two main possible applications of the proposed techniques, namely, an equality matching and a complementarity matching.

An equality matching permits secretly verifying whether two entities both possess a property, i.e. belong to a same group. The case of two CIA agents attempting to make contact has already been mentioned as an example of this scenario. In another scenario a patient may be affected by a chronic disease for which he needs constant monitoring of health conditions, and the monitoring may be performed using a body sensor network (BSN), made of a set of sensors that are continuously monitoring parameters such as blood pressure, temperature and so forth. The BSN may periodically need to transfer the information related to the patients health to the fixed network of healthcare practitioners, where any alert can be detected promptly such that countermeasures can be taken if necessary. Hence, the BSN must periodically connect to some trusted gateway (TG) where all information can be dumped. TGs are installed in a number of public places, and the connection between the BSN and the trusted gateway can be established using a wireless link. When connecting to a TG, the BSN of the patient needs to be sure to be dealing with a TG and not a spoofed node whose aim is to collect private information. On the other hand, TGs should data only from legitimate BSNs. Hence, equality matching can be used in a BSN/TG secret handshake to verify that both nodes belong to one and the same healthcare network, assessing whether they own a credential that certifies the membership to this respective healthcare network. Once this initial trust is established, standard security protocols can be used to perform an information exchange. This use case can be generalized to a mutual authentication between wireless sensor network (WSN) nodes and WSN gateways in a generic WSN system.

A complementarity matching is another type of operation facilitated by the techniques described herein. Complementarity matching can be interpreted in two ways. On the one hand this could be a collaborative process, whose purpose is to match pairs of entities, namely users, that hold complementary properties whose simultaneous presence allows particular operations to be performed that were not allowed to separate entities individually. For example, two keys, possessed by two different people may be necessary to open a lock to a vault, and therefore each of the two people must cooperate and act complementary to each other to open the lock to the vault. In this scenario, a secret handshake using the techniques described herein may provide assurance to the complementary users that they actually can trust each other to perform the cooperative process.

Another approach for complementarity matching is a detection of conflicts, which may be explained with reference to an example in which barrels containing valuable or hazardous chemical elements are shipped on good trains. Good trains can host barrels belonging to different companies, and checks should be made in order to prevent stock barrels containing elements that could react together close to each other. Still, these checks should be carried out in a way that the privacy of the content of the barrels is preserved with respect to the other companies and to external eavesdroppers. Using the techniques described herein, each stock of barrels containing the same element may be equipped with a wireless node (e.g., an RFID tag and sensor). This node can be equipped with a credential certifying its content, released by some trusted entity. In addition, this node can receive an appropriate matching reference (e.g., via its sensor) to verify the matching with some barrel holding conflicting chemical elements. Whenever some stock of barrels is added to the train, a secret handshake can be performed with other nodes associated with barrels already on the train to verify whether conflicts exist. If so, the node can raise an alarm that can be treated immediately by the personal of the train. In this way, however, it is only determined that there is a matching without knowing exactly the content of the other barrels thus preserving some privacy between the different companies. However, if no matching is verified, then the node has no clue on the content of the sibling stock associated with other nodes.

Secret handshakes can be used in a dynamic supply chain network, where the actual route of goods flowing through the supply chain may not be known in advance. This condition also implies that the participants that are the nodes of the actual route might not know each other in advance. For instance, a producer of computer hardware might not (or, sometimes, is not even able to) know all retailers of the producer's products in advance. Such an environment raises additional problems, for instance the authentication of products on the retailer's side to provide anti-counterfeiting measures, or to provide a recall procedure by the producer.

In this scenario, secret handshake protocols with revocation capabilities can be used to allow nodes in the supply chain to establish trust dynamically with the next participant to the process. It is clear that if an attacker manages to break the system and steal credentials of users of the system, the attacker can then conduct business on behalf of the legitimate user by passing himself off as a legitimate entity and gaining the trust of other users. Upon this event, an authentication center integrating secret handshake a revocation mechanism in the supply chain management system may issue the revocation value for the compromised credential, thus immediately preventing any further attack.

Secret handshakes also can be used in benchmarking systems in which different companies disclose sensitive information to a trusted service provider. This information is looked up by the members of the system under particular circumstances: (i) the information is only disclosed in terms of statistically processed data, so that a user can just obtain global trends and not the single data of a given company; (ii) the scope and subject of the queries must be anonymized and untraceable, since the mere fact that a company is querying data about "something" is already a very sensitive information; as an example, Microsoft extensively researching information about search engines may disclose its intent to buy shares of Yahoo!, and may trigger counter-actions by other partners; (iii) access to information is not unlimited, but regulated by contractual rules such as "only fellow software companies can access data about software companies."

Based on these requirements, the benchmarking system can be outsourced to a central entity, and access to that entity can be regulated by a secret handshake, whereby entities trying to access benchmarking data must prove their rights to access data, and have in the same time security protections such as untraceability and anonymity. The revocation is essential to cope with the changing requirements, because after a change of access rights, revocation capabilities can be used to revoke old access rights, and the simple issue of new credentials allows for the creation of new access rights.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for a first user device to verify an association with a second user device through a secret handshake protocol, the method comprising:

maintaining information about a reusable identification handle for the first user device in a memory of the first user device, wherein the information about the reusable identification handle is provided by a trusted third party device;

maintaining information about a reusable property credential for the first user device in the memory of the first user device, wherein the information about the reusable property credential is provided by the trusted third party;

maintaining information about a matching reference for verifying an association with another user device by the first user device in the memory of the first user device, wherein the information about the matching reference is provided by the trusted third party;

transmitting, by the first user device, information based on the reusable identification handle and based on the reusable property credential to the second user device;

receiving, by the first user device, first information based on a reusable identification handle for the second user device;

receiving, by the first user device, second information based on a reusable property credential for the second user device;

performing, by the first user device, a first comparison of a combination of the first information and the second information with the matching reference to determine whether the property credential for the second user device matches the first user device matching reference;

performing, by the first user device, a second comparison of the first information with information published on a revocation list to determine whether the second user device's credentials have been revoked from usage, the second comparison being performed without revealing the second user device's credentials to either the first user device or the second user device; and based on the first comparison and the second comparison, determining, by the first user device, whether or not to verify the association of second user device with the first user device.

2. The method of claim 1, further comprising cryptographically encoding the information based on the reusable identification handle and the information on the reusable property credential prior to transmission.

3. The method of claim 2, wherein cryptographically encoding the information includes:
generating a random value;
generating a cryptographically-encoded version of the information based on the reusable identification handle based on the information handle and the random value; and
generating a cryptographically-encoded version of the information based on the reusable property credential based on the information handle and the random value.

4. The method of claim 1, further comprising:
receiving via a secure channel the information about the reusable identification handle for the first user device and the information about a reusable property credential for the first user device from an authentication component upon verification that the first user device is entitled to be associated with the second user device;
receiving via a secure channel the matching reference upon verification that the first user device is entitled to verify that the second user device is associated with the first user device.

5. The method of claim 4, wherein the information about the reusable property credential for the first user device is cryptographically-encoded to prevent acquiring direct knowledge of the actual reusable property credential for the first user device, and
wherein the information about the reusable identification handle for the first user is cryptographically-encoded to prevent acquiring direct knowledge of the actual reusable identification handle for the first user device.

6. The method of claim 1,
wherein the information based on a reusable identification handle for the second user device is additionally based on a random number generated at by the second user device; and
wherein the information based on a reusable credential for the second user device is additionally based on the random number generated by the second user device.

7. The method of claim 1, wherein the first information received from the second user device based on the reusable identification handle for the second user device is cryptographically-encoded such that both the first user device and the second user device are prevented from acquiring direct knowledge of the actual reusable credential for the second user device.

8. A user device comprising:
a memory configured to maintain:
(a) information about a reusable identification handle for the user device, wherein the information about the reusable identification handle is provided by a trusted third party device;
(b) information about a reusable credential for the user device, wherein the information about the reusable credential is provided by the trusted third party;
(c) information about a matching reference for verifying an association with another user device, wherein the information about the matching reference is provided by the trusted third party; and
a processor configured to:
(d) transmit information based on the reusable identification handle and based on the reusable credential to the another user device;
(e) receive first information based on a reusable identification handle for the another user device;
(f) receive second information based on a reusable credential for the another user device;
(g) perform a first comparison of the first information and the second information with the matching reference to determine whether the another user device's credentials match the user device's matching reference;
(h) perform a second comparison of the first information with information published on a revocation list to determine whether the another user device's credentials have been revoked from usage, the second comparison being performed without revealing the another user device's credentials to either the user device or the another user device; and
(i) based on the first comparison and the second comparison determine whether or not to verify the association of the another user device with the user device.

9. The user device of claim 8, wherein the processor is further configured to cryptographically encode the information based on the reusable identification handle and the information on the reusable credential prior to transmission.

10. The user device of claim 9, wherein cryptographically encoding the information includes:
generating a random value;
generating a cryptographically-encoded version of the information based on the reusable identification handle based on the information handle and the random value; and
generating a cryptographically-encoded version of the information based on the reusable credential based on the information handle and the random value.

11. The user device of claim 8, wherein the processor is further configured to:
receive via a secure channel the information about the reusable identification handle for the user device and the information about a reusable credential for the user device from an authentication component upon verification that the user device is entitled to be associated with the another user device;
receive via a secure channel the matching reference upon verification that the user device is entitled to verify that the another user is associated with the user device.

12. The user device of claim 11, wherein the information about the reusable credential for the user device is cryptographically-encoded to prevent from acquiring direct knowledge of the actual reusable credential for the user device, and
wherein the information about the reusable identification handle for the user device is cryptographically-encoded to prevent from acquiring direct knowledge of the actual reusable identification handle for the user device.

13. The user device of claim 8,
wherein the information based on a reusable identification handle for the another user device is additionally based on a random number generated at by the another user device; and
wherein the information based on a reusable credential for the another user device is additionally based on the random number generated at by the another user device.

14. The user device of claim 8, wherein the first information received from the another user device based on the reusable identification handle for the another user device is cryptographically-encoded such that the both the user device and the another user device are prevented from acquiring direct knowledge of the actual reusable credential for the another user device.

15. A user device comprising:
a means for maintaining information about a reusable identification handle for the user device, wherein the information about the reusable identification handle is provided by a trusted third party;

a means for maintaining information about a reusable credential for the user device, wherein the information about the reusable credential is provided by the trusted third party;

a means for maintaining information about a matching reference for verifying an association with another user device, wherein the information about the matching reference is provided by the trusted third party;

a means for transmitting information based on the reusable identification handle and based on the reusable credential to the another user device;

a means for receiving first information based on a reusable identification handle for the another user device;

a means for receiving second information based on a reusable credential for the another user device;

a means for performing a first comparison of the first information and the second information with the matching reference to determine whether the another user device's credentials match the user device's matching reference;

a means for performing a second comparison of the first information with information published on a revocation list to determine whether the another user device's credentials have been revoked from usage, the second comparison being performed without revealing the another user device's credentials to either the user device or the another user device; and a means for determining whether or not to verify the association of the another user device with the user device, wherein the determination is based on the first comparison and the second comparison.

16. The user device of claim 15, further comprising a means for cryptographically encoding the information based on the reusable identification handle and the information on the reusable credential prior to transmission.

17. The user device of claim 16, further comprising:

a means for generating a random value; and wherein the means for cryptographically encoding includes means for generating a cryptographically-encoded version of the information based on the reusable identification handle based on the information handle and the random value; and wherein the means for cryptographically encoding includes means for generating a cryptographically-encoded version of the information based on the reusable credential based on the information handle and the random value.

18. The user device of claim 15, wherein the information about the reusable credential for the user device is cryptographically-encoded to prevent from acquiring direct knowledge of the actual reusable credential for the user device, and wherein the information about the reusable identification handle for the user device is cryptographically-encoded to prevent from acquiring direct knowledge of the actual reusable identification handle for the user device.

19. The user device of claim 15, wherein the information based on a reusable identification handle for the another user device is additionally based on a random number generated at by the another user device; and wherein the information based on a reusable credential for the another user device is additionally based on the random number generated at by the another user device.

20. The user device of claim 15, wherein the first information received from the another user device based on the reusable identification handle for the another user device is cryptographically-encoded such that the both the user device and the another user device are prevented from acquiring direct knowledge of the actual reusable credential for the another user device.

\* \* \* \* \*